United States Patent Office 3,388,135
Patented June 11, 1968

3,388,135
NOVEL 2-PHENYL-THIANAPHTHENE-DIAMIDINES
Otto Dann, Meilwaldstrasse 11, Erlangen-Bubenreuth, Germany
No Drawing. Continuation-in-part of application Ser. No. 431,697, Feb. 10, 1965. This application June 15, 1967, Ser. No. 646,207
Claims priority, application Germany, Feb. 19, 1964, D 43,670
6 Claims. (Cl. 260—330.5)

ABSTRACT OF THE DISCLOSURE

The compounds are di-amidino-substituted 2-phenyl-thianaphthenes useful as trypanocides in warm-blooded animals.

---

This is a continuation-in-part of copending application Ser. No. 431,697, filed Feb. 10, 1965, now abandoned.

This invention relates to novel 2-phenyl-thianaphthene-diamidines and acid addition salts thereof, as well as to methods of preparing these compounds.

More particularly, the present invention relates to 2-phenyl-thianaphthene-diamidines of the formula

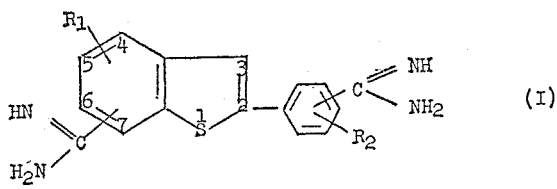

wherein $R_1$ and $R_2$, which may be identical to or different from each other, are each hydrogen, halogen, lower alkyl on lower alkoxy, and their non-toxic, pharmacologically acceptable acid addition salts.

Two compounds according to the invention may be prepared by various methods involving well known chemical principles, among which the following have been found to be most convenient and efficient:

METHOD A

By reacting a 2-phenyl-thianaphthene-dinitrile of the formula

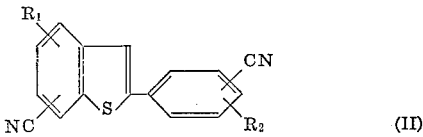

wherein $R_1$ and $R_2$ have the same meanings as in Formula I, with a hydrogen halide to form a di-hydrogen halide salt of a 2-phenyl-thianaphthene-diiminoether of the formula

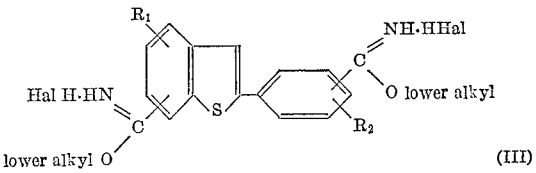

wherein $R_1$ and $R_2$ have the same meanings as in Formula I and Hal is a halogen, and reacting the di-iminoether salt III with ammonia.

The conversion of the dinitrile II into the di-iminoether salt III and the latter's reaction with ammonia are advantageously carried out in the presence of anhydrous solvent at room temperature. The employment of a dry gaseous hydrogen halide is preferred to effect the conversion of the dinitrile into the di-iminoether salt, and dry gaseous ammonia is preferably used for conversion of the di-iminoether salt into the desired end product. Chloroform is preferred as the solvent medium.

The 2-phenyl-thianaphthene-dinitriles of the Formula II, which are used as starting compounds for the preparation of the novel diamidines according to this method, are themselves novel and may be prepared by methods involving well known chemical principles; for example, by subjecting a tolyl-methylphenacyl-sulfide to a ring closure reaction to form a 2-tolyl-methyl-thianaphthene, halogenating the two methyl groups, converting the halomethyl groups into aldehyde groups, converting the dialdehyde into the corresponding dioxime, and dehydrating the dioxime with a conventional dehydrating agent.

For instance, m-tolyl - (4 - methyl - phenacyl)-sulfide (M.P. 44–45° C.) is subjected to a ring closure reaction with aluminum chloride to form 2-(p-tolyl)-6-methyl-thianaphthene, which is then brominated with bromosuccinimide to give the corresponding 4',6-bis-bromo-ethyl compound (M.P. 191–193° C.), the latter is then transformed with hexamethylenetetramine into 6-formyl-2-(4'-formyl-phenyl)-thianaphthene, which is converted into the corresponding dioxime (M.P. 270–272° C.), which is in turn reacted with acetic acid anhydride to form 6-cyano-2-(4'-cyanophenyl)-thianaphthene (M.P. 262–265° C.).

6-cyano - 2 - (3' - cyano-phenyl)-thianaphthene (M.P. 217–218.5° C.) and 5-cyano-2-(3'-cyano-phenyl)-thianaphthene (M.P. 190–191° C.) may be prepared in analogous fashion. However, these two starting compounds may be more conveniently prepared from the more readily accessible m- or p-tolyl-3-bromo-phenacyl-sulfide through the intermediate 6- or 5-formyl-2-(3'-bromo-phenyl)-thianaphthene, conversion of the latter into the corresponding mono-oxime which is treated with a dehydrating agent to form 6-cyano-2-(3'-bromophenyl)-thianaphthene (M.P. 158–159.5° C.) or 5-cyano-2-(3'-bromophenyl)-thianaphthene (M.P. 165–166° C.), and subsequent replacement of the bromo-substituent by the cyano group pursuant to conventional methods.

METHOD B

By heating a mixture of a dicyano-substituted 2-phenyl-thianaphthene of the Formula II with ammonium thiocyanate to a temperature of 150 to 250° C. in the absence of a solvent.

The 2-phenyl-thianaphthene-diamidines I obtained by the above-described methods of preparation are organic bases and may, if desired, be converted into their non-toxic, pharmacologically acceptable acid addition salts by known methods, such as by dissolving the free base in water and acidifying the aqueous solution with one or more two molar equivalents of the desired inorganic or organic acid. Examples of inorganic and organic acids which form non-toxic, pharmacologically acceptable acid addition salts with the 2-phenyl-thianaphthene-diamidines according to the present invention include, but are not limited to, hydrochloric acid, sulfuric acid, phosphoric acid, tartaric acid, citric acid, succinic acid, maleic acid, 8-chlorotheophylline and the like.

The following examples will further illustrate the present invention and will enable others skilled in the art to understand the invention more completely. It should be understood, however, that the invention is not limited to the particular examples given below.

Example 1.—Preparation of 6-amidino-2-(4'-amidinophenyl)-thianaphthene dihydrochloride by Method A 6 gm. (0.023 mol) of 6-cyano-2-(4'-cyano-phenyl)-thianaphthene were dissolved in 500 cc. of chloroform, the resulting solution was filtered, and the filtrate was admixed with 50 cc. of absolute ethanol. Thereafter, while cooling exteriorly with ice, the ethanolic solution was saturated with gaseous hydrogen chloride which had been dried by passing it through concentrated sulfuric acid. The reaction solution was then allowed to stand for two days at room temperature, and thereafter dry gaseous hydrogen chloride was again passed through it for one hour. The reaction solution was then allowed to stand at room temperature for five days, and at the end of that time the crystalline substance which had separated was isolated by vacuum filtration and dried. 6 gm. (65% of theory) of the di-iminoether dihydrochloride of the formula

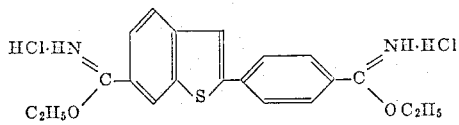

were obtained.

700 cc. of absolute ethanol were saturated with dry gaseous ammonia, and the resulting solution was admixed with the dry di-iminoether dihydrochloride previously obtained. A suspension was formed whose solid component went into solution after a short period of standing at room temperature. The solution was allowed to stand at room temperature for four additional days, and then the almost white precipitate formed during that time was separated by vacuum filtration. It was identified to be 6-amidino-2-(4'-amidino-phenyl)-thianaphthene of the formula

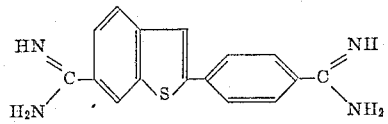

The product thus obtained was dissolved in 100 cc. of water, and 100 cc. of concentrated hydrochloric acid were added to the aqueous solution. A very voluminous, poorly filterable precipitate was formed. The precipitate was separated, slurried in 200 cc. of acetone, the slurry was vacuum filtered, and the filter cake was dried. 6 gm. (83% of theory) of the dihydrochloride of 6-amidino-2-(4'-amidino-phenyl)-thianaphthene, M.P. 365–370° C., were obtained.

Example 2.—Preparation of 6-amidino-2-(4'-amidino-phenyl)-thianaphthene dihydrochloride by Method B 1 gm. of 6-cyano-2-(4'-cyano-phenyl)-thianaphthene was intimately admixed with 3 gm. of ammonium thiocyanate, and the mixture was heated for two and a half hours at 180° C. Thereafter, the reaction mixture was admixed with dilute hydrochloric acid, the resulting solution was filtered, and the filtrate was admixed with acetone until formation of the precipitate caused thereby was complete. The precipitate was separated and was identified to be 6-amidino-2-(4'-amidino-phenyl)-thianaphthene dihydrochloride, M.P. 365–370° C., i.e. identical to the dihydrochloride obtained in Example 1.

Example 3.—Preparation of 6-amidino-2-(3'-amidino-phenyl)-thianaphthene by Method A Using a procedure analogous to that described in Example 1, 6-amidino-2-(3'-amidino-phenyl)-thianaphthene of the formula

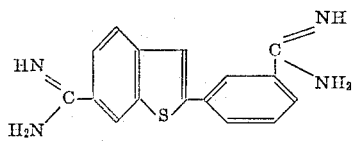

was prepared from 6-cyano-2-(3'-cyano-phenyl)-thianaphthene. Its dihydrochloride had a melting point of 195–200° C.

Example 4.—Preparation of 5-amidino-2-(3'-amidino-phenyl)-thianaphthene by Method A Using a procedure analogous to that described in Example 1, 5-amidino-2-(3'-amidino-phenyl)-thianaphthene of the formula

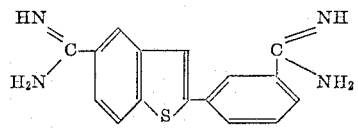

was prepared from 5-cyano-2-(3'-cyano-phenyl)-thianaphthene.

The compounds of the present invention, that is, those embraced by Formula I and their non-toxic, pharmacologically acceptable acid addition salts, have useful pharmacodynamic properties. More particularly, they exhibit highly effective trypanocidal properties in warm-blooded animals, such as cattle, horses, antelopes, dogs and camels; in other words, they are destructive to trypanosomes, such as *Trypanosoma gambiense* and *Trypanosoma rhodesiense*.

For pharmaceutical purposes the compounds of the present invention are administered subcutaneously to a warm-blooded animal infected with Trypanosoma, i.e., by subcutaneous injection of a sterile aqueous 1% solution of the active trypanocidal ingredient. Most preferably, the hypodermic solution is prepared immediately prior to administration from a sterile ampule containing 200 mgm. of the active ingredient. The average trypanocidally effective single dose of the compounds according to the present invention is 3 mgm./kg. body weight.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

I claim:
1. A compound of the formula

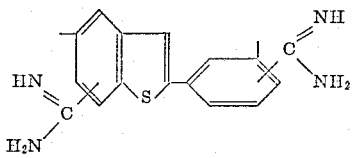

or a non-toxic, pharmacologically acceptable acid addition salt thereof, wherein the amidino group substitutes the 3 or 4 position on the phenyl ring and the 5 or 6 position on the thianaphthyl ring.

2. 2-(4'-amidino-phenyl)-6-amidino-thianaphthene.
3. 2-(4'-amidino-phenyl)-6-amidino-thianaphthene dihydrochloride.
4. 2-(3'-amidino-phenyl)-6-amidino-thianaphthene.
5. 2-(3'-amidino-phenyl)-6-amidino-thianaphthene dihydrochloride.
6. 2-(3'-amidino-phenyl)-5-amidino-thianaphthene.

References Cited

UNITED STATES PATENTS 2,204,983  6/1940  Ewins et al. _____ 260—564
2,277,861  3/1942  Ewins et al. _____ 260—564

JOHN D. RANDOLPH, *Primary Examiner.*

C. M. SHURKO, *Assistant Examiner.*